United States Patent
Rodgers

(10) Patent No.: US 11,409,351 B2
(45) Date of Patent: Aug. 9, 2022

(54) SMART FILTERING OF FRAMES TO IMPROVE LOW-POWER TIME

(71) Applicant: Hughes Network Systems, LLC, Germantown, MD (US)

(72) Inventor: Michael Rodgers, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 428 days.

(21) Appl. No.: 16/548,775

(22) Filed: Aug. 22, 2019

(65) Prior Publication Data

US 2021/0055774 A1 Feb. 25, 2021

(51) Int. Cl.
| | |
|---|---|
| G06F 15/16 | (2006.01) |
| G06F 1/3209 | (2019.01) |
| H04B 7/185 | (2006.01) |
| H04L 101/663 | (2022.01) |
| H04L 101/622 | (2022.01) |
| H04L 41/12 | (2022.01) |

(52) U.S. Cl.
CPC ....... *G06F 1/3209* (2013.01); *H04B 7/18519* (2013.01); *H04L 41/12* (2013.01); *H04L 61/6022* (2013.01); *H04L 61/6063* (2013.01)

(58) Field of Classification Search
CPC ... G06F 1/3209; H04B 7/18519; H04L 41/12; H04L 61/6022; H04L 61/6063

USPC .......................................... 709/203; 713/320
See application file for complete search history.

(56) References Cited

U.S. PATENT DOCUMENTS

| | | | | |
|---|---|---|---|---|
| 5,802,305 | A * | 9/1998 | McKaughan | H04L 12/12 709/227 |
| 9,717,066 | B2 * | 7/2017 | Battista | H04L 67/12 |
| 2009/0077347 | A1 * | 3/2009 | Edwards | H04L 12/12 712/34 |
| 2013/0097436 | A1 * | 4/2013 | Kumar | H04W 52/0238 713/320 |
| 2014/0090047 | A1 * | 3/2014 | Yuan | G06F 1/3287 726/13 |

* cited by examiner

*Primary Examiner* — Duyen M Doan
(74) *Attorney, Agent, or Firm* — Sheppard, Mullin, Richter & Hampton LLP

(57) ABSTRACT

Some implementations of the disclosure are directed to a media access controller (MAC) of a mobile satellite terminal that may autonomously determine whether or not wake up a software processor of the mobile satellite terminal depending on information contained in a packet received from a user device. The MAC may receive a frame contained in a packet transmitted by a user device to the mobile satellite terminal; automatically determine whether to accept or drop the frame by applying one or more programmed filters to the frame; if the frame is accepted: store the frame in the memory, and cause a power controller to power on the software processor to process the stored frame; and if the frame is not accepted: drop the frame without causing the power controller to power on the software processor.

18 Claims, 7 Drawing Sheets

| Inst. No. | Field | Value | Action if equal | Action if not equal |
|---|---|---|---|---|
| 1 | Multicast bit of the destination address of the MAC header | 1, indicating a multicast frame | Reject Frame | Go to next instruction |
| 2 | Protocol field of MAC header | DHCP protocol identifier | Accept Frame | Go to next instruction |
| 3 | Protocol field of MAC header | ARP protocol identifier | Jump to instruction 14 | Go to next instruction |
| 4 | Destination address of MAC header | Satellite terminal's MAC address | Go to next instruction | Reject Frame |
| 5 | Protocol field of MAC header | IP protocol identifier | Go to next instruction | Reject Frame |
| 6 | Protocol field of IP header | TCP protocol identifier | Accept Frame | Go to next instruction |
| 7 | Protocol field of IP header | UDP protocol identifier | Go to next instruction | Reject Frame |
| 8 | Destination address of the IP header | Broadcast IP address | Reject Frame | Go to next instruction |
| 9 | Destination address of the IP header, masked for the multicast IP address block | Multicast IP address block | Reject Frame | Go to next instruction |
| 10 | Destination address of IP header, masked by the local subnet mask | Local subnet base IP address | Go to next instruction | Accept Frame |
| 11 | Destination address of the IP header | Satellite terminal's IP address | Go to next instruction | Reject Frame |
| 12 | Destination port of UDP header | MDNS port number | Reject Frame | Go to next instruction |
| 13 | Destination port of UDP header | SSDP port number | Reject Frame | Accept Frame |
| 14 | Operation field of ARP header | Response identifier | Accept Frame | Go to next instruction |
| 15 | Operation field of ARP header | Request identifier | Go to next instruction | Reject Frame |
| 16 | Target IP Address of ARP message | Satellite terminal's IP address | Accept Frame | Go to next instruction |
| 17 | Target IP Address of ARP message, masked by the local subnet mask | Local subnet base IP address | Reject Frame | Accept Frame |

FIG. 3

SMART FILTERING OF FRAMES TO IMPROVE LOW-POWER TIME

BACKGROUND

Power consumption reduction is often an important design goal in mobile networked devices. For example, Wake-on-LAN (WoL) is an Ethernet or token ring computer networking standard that may be used to turn or awaken computers using a networking message. In a typical implementation of WoL, the target computer's Ethernet PHY must listen for a magic packet having a specific configuration. The Ethernet PHY may refer to a chip or component that implements the hardware send and receive function of Ethernet frames. In some implementations, the magic packet is a broadcast frame containing anywhere within its payload 6 bytes of all 255 (FF FF FF FF FF FF in hexadecimal), followed by sixteen repetitions of the target computer's 48-bit media access control address, for a total of 102 bytes.

WoL has its limitations. First, the typical magic packet requires hardware support of WoL on the target computer, and it requires the target computer's media access control address. Second, because WoL operates on the Ethernet PHY below the IP protocol layer, IP addresses and DNS names are meaningless and so the media access control address is required. Third, WoL may require a very specific tool to generate the necessary magic packet with knowledge of what the Ethernet PHY is listening for. Moreover, WoL may be very difficult to use as it may require the user's involvement and knowledge that the target computer is off.

SUMMARY

Some implementations of the disclosure are directed to a media access controller (MAC) of a mobile communication terminal (e.g., mobile satellite terminal) that may autonomously determine whether or not wake up a software processor of the mobile communication terminal depending on information contained in a packet received from a user device.

In one embodiment, a mobile satellite terminal comprises: a power controller to control power supplied to components of the mobile satellite terminal; a software processor; a memory; and a MAC configured to: receive a frame contained in a packet transmitted by a user device to the mobile satellite terminal; automatically determine whether to accept or drop the frame by applying one or more programmed filters to the frame; if the frame is accepted: store the frame in the memory, and cause the power controller to power on the software processor to process the stored frame; and if the frame is not accepted: drop the frame without causing the power controller to power on the software processor. In some implementations, the mobile satellite terminal further comprises a satellite modem to communicate with a satellite, the satellite modem comprising a digital signal processor. In some implementations, the MAC is an Ethernet MAC, and the frame is an Ethernet frame.

In some implementations, the power controller, the MAC, the memory, and the software processor are components of a single chip of the mobile satellite terminal, where the MAC and software processor are part of two different power domains of the chip that the power controller can separately power on. In some implementations, the memory, the MAC, and the software processor are components of an application specification integrated circuit (ASIC) of the mobile satellite terminal. The two different power domains may comprise: a peripheral power domain comprising user-facing peripherals that continue normal operation during a low-power state, the user-facing peripherals comprising the MAC, the memory, and memory bus fabric between the MAC and memory; and a software processor domain comprising the software processor and connections to the peripheral power domain for use when the software processor domain is active. In some implementations, after the MAC causes the power controller to power on the software processor, the software processor is configured to process the stored frame, and after the software processor processes the stored frame and subsequently becomes idle, the power controller is configured to power off the software power domain containing the software processor while leaving on the MAC.

In other implementations, the MAC is on a first chip of the mobile satellite terminal and the software processor is on a second chip of the mobile satellite terminal, and the power controller can independently power the first and second chips.

In some implementations, applying one or more filters to the frame comprises examining one or more fields of the frame, wherein the one or more fields comprise at least one of: a source or destination MAC address, a source or destination interne protocol (IP) address, a field indicating what protocol is encapsulated in a payload of the frame, and a field containing port information from the user datagram protocol (UDP) or transmission control protocol (TCP). In some implementations, the MAC is configured to drop the frame if it contains a payload that is never sent over a satellite space link and is not directed at the satellite terminal itself. In particular implementations, the MAC is configured to drop the frame if at least one of the following conditions is satisfied by the frame: it contains an address resolution protocol (ARP) resolve request for IP addresses on a local subnet that is not for the satellite terminal's IP address; it is a unicast frame not directed at the satellite terminal; it contains a protocol that operates only on the local subnet and is used for local device discovery; it is sent by an IP address that is not allowed to use the space link; and it is sent by a MAC address that is not on a whitelist.

In some implementations, the MAC causing the power controller to power on the software processor to process the stored frame comprises: asserting an interrupt to the power controller and software processor, wherein when the power controller powers on the software processor, the software processor receives and services the interrupt, copies the frame deposited in memory by the MAC, and passes the frame to the software processor's network stack software.

In some implementations, the MAC is programmed by the software processor such that the MAC can autonomously make decisions to accept or drop frames, without interaction from the software processor.

In one embodiment, a method comprises: receiving, at a MAC of a mobile satellite terminal, a frame contained in a packet transmitted by a user device to a mobile satellite terminal; automatically determining at the MAC whether to accept or drop the frame by applying one or more programmed filters to the frame; if the frame is accepted: the MAC storing the frame in a memory of the mobile satellite terminal, and causing a power controller of the mobile satellite terminal to power on a software processor of the mobile satellite terminal to process the stored frame; and if the frame is not accepted: the MAC dropping the frame without causing the power controller to power on the software processor. In some implementations, the method further comprises: accepting the frame; and after the MAC causes the power controller to power on the software processor, processing the stored frame using the software processor.

In some implementations, applying one or more programmed filters to the frame comprises: examining one or more fields of the frame, wherein the one or more fields comprise at least one of: a source or destination MAC address, a source or destination internet protocol (IP) address, a field indicating what protocol is encapsulated in a payload of the frame, and a field containing port information from the user datagram protocol (UDP) or transmission control protocol (TCP). In some implementations, the frame is not accepted if it contains a payload that is never sent over a satellite space link and is not directed at the mobile satellite terminal itself.

In one embodiment, a non-transitory computer readable medium has executable instructions stored thereon that when executed by a processor, cause a mobile communication terminal to perform operations of: receiving a frame contained in a packet transmitted by a user device to the mobile communication terminal; automatically determining whether to accept or drop the frame by applying one or more programmed filters to the frame; if the frame is accepted: storing the frame in a memory, and causing a power controller to power on a software processor of the mobile communication terminal to process the stored frame; and if the frame is not accepted: dropping the frame without causing the power controller terminal to power on the software processor. In some implementations, the operations of receiving the frame, automatically determining whether to accept or drop the frame, storing the frame, and dropping the frame are performed by a media access controller of the mobile communication terminal, wherein the mobile communication terminal is a mobile satellite terminal.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 3 is a table illustrating instructions under which an Ethernet MAC may be programmed to reject or accept Ethernet frames, in accordance with a particular implementation of the disclosure.

Figure 1:
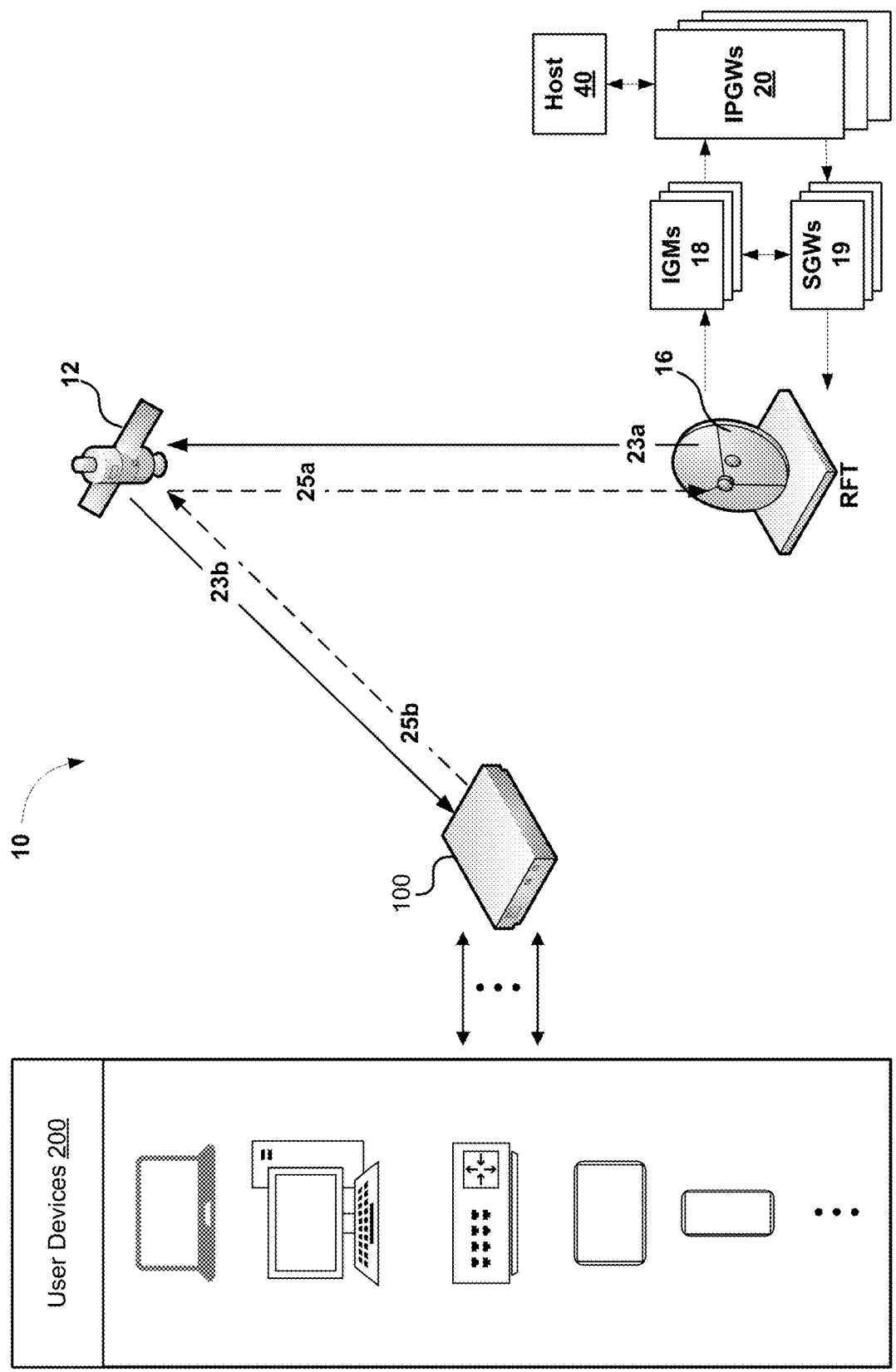
FIG. 1 illustrates an example satellite network including a mobile satellite terminal in which the technology described herein may be implemented.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

In Mobile Satellite (MSAT) technology, a significant amount of battery power may be consumed to enable a mobile user terminal (UT) to communicate with a satellite many thousands of feet away. As such, an important design goal in MSAT technology is often to reduce power consumption to prolong battery life of a UT.

A user interface for UTs may include Ethernet. However, many client personal computers (PCs) may emit a constant background chatter of Ethernet packets that are useless to the UT, and are not intended to be sent over the space link. For example, a client PC may emit an address resolution protocol (ARP) request for an IP address on a local subnet that is not the UT's address. As another example, a client PC may emit packets in accordance with multicast DNS (mDNS), Simple Service Discovery Protocol (SSDP), or other protocols that operate only on the local subnet and are used only for local device discovery of other computers. Such packets may be sent many times per second, requiring the UT's software processor (e.g., CPU) to handle each one, even though there is no need for the software processor to do so. This may place a serious upper limit on how long the UT may stay in a low-power mode.

One possible approach to this problem would be for the UT to wake up the processor whenever any packet arrives. However, this would significantly limit the amount of time the UT spends in a lower power mode. Another possible approach to this problem would be to ignore every packet except for WoL magic packets. However, as discussed above, WoL has specific hardware requirements, may be difficult for a user to use, and may require the user's involvement to wake up the UT. Moreover, WoL would still reduce the opportunities for the UT to enter a low power mode, because the user would need to be informed that waking the UT will require using the special WoL tool. Because users may see this tool as a hassle, UT design may be incentivized to reduce or minimize how often the UT enters a lower power mode. Indeed, using a WoL tool to wake the UT every time the user wishes to navigate to a new web page would be tedious. A UT employing WoL would likely wait several minutes before entering a low power mode.

As the foregoing discussion illustrates, there is a need for improved systems and methods for reducing power consumption in mobile satellite terminals. To this end, implementations of the disclosure are directed to systems and methods for the improving the amount of time a UT can spend in a low-power mode, while still being responsive to real user network traffic. In accordance with implementations of the disclosure, a media access controller (MAC) (e.g., Ethernet MAC) of a mobile satellite terminal may autonomously determine whether or not wake up a software processor of the mobile satellite terminal depending on information contained in a packet received from a user device. In particular, the MAC may receive a frame contained in a packet transmitted by a user device to the mobile satellite terminal; automatically determine whether to accept or drop the frame by applying one or more programmed filters to the frame; if the frame is accepted: store the frame in the memory, and cause a power controller to power on the software processor to process the stored frame; and if the frame is not accepted: drop the frame without causing the power controller to power on the software processor. In implementations, the MAC and the software processor may be part of two different power domains of a chip including the MAC and the software processor. For example, an application-specific integrated circuit (ASIC) may separately power off the MAC and the software processor.

As will be appreciated from the disclosure, in addition to the power savings benefits, the systems and methods described herein for reducing power consumption may be implemented in a completely transparent fashion, without requiring the user's involvement. For example, in contrast to WoL technology, the user may operate a satellite modem in accordance with the implementations described herein without tracking when the satellite modem enters or exits a low power mode. And, without depending on user involvement, the satellite modem may exercise opportunities to enter a low power mode much more frequently, even for small amounts of time, which may increase the overall mount of time spent in a low power mode.

FIG. 1 illustrates an example satellite network 10 including a mobile satellite terminal 100 in which the technology described herein may be implemented. It should be noted that although the power saving systems and methods described herein will primarily be described in the context of satellite networks including mobile satellite terminals that communicate with user devices using the Ethernet communication protocol, the systems and methods described herein may also be applied to mobile devices of terrestrial networks that communicate with user devices using the Ethernet protocol. For example, the technology described herein may be implemented in context of terrestrial cellular networks including modems that communicate with user devices using the Ethernet communication protocol. Moreover, it should be noted that although the power saving systems and methods described herein will primarily be described in the context of Ethernet communications, the techniques described herein may be applicable to WiFi communications or other protocol communications involving a mobile terminal with a MAC that may be programmed with frame filters.

Satellite network 10 in this example can include a satellite 12, mobile satellite terminal 100, radio frequency terminals (RFT) 16, inroute group managers (IGMs) 18, satellite gateways (SGWs) 19, and IP gateways (IPGWs) 20. The satellite network may be a shared access broadband network. Other types of shared access networks may include, for example, wireless networks such as a $5^{th}$ Generation (5G) cellular network, $4^{th}$ Generation Long Term Evolution (4G LTE) and WiMAX networks, which may include cellular and WiFi equipped devices. Although a single satellite 12 is shown in this example, it should be appreciated that satellite network 10 may be a multi-satellite network 10 where a particular satellite services mobile satellite terminal 100 depending on the present location of terminal 100 and present location of the spotbeam of the satellite.

Feeder links may carry data between RFT 16 and satellite 12, and may include: forward uplink 23 for transmitting data from RFT 16 to satellite 12; and return downlink 25a for transmitting data from satellite 12 to RFT 16. User links may carry data between satellite 12 and mobile satellite terminal 100, and may include: return uplink 25b for transmitting data from mobile satellite terminal 100 to satellite 12; and forward downlinks 23b for transmitting data from satellite 12 to terminal 100. Forward uplinks 23a and forward downlink 23b form an outroute, and return uplinks 25b and return downlinks 25a may form an inroute. SGWs 19 may include high capacity earth stations with connectivity to ground telecommunications infrastructure. SGWs 19 may be communicatively connected to RFT 16 and other RFTs (not shown). RFT 16 may be the physical equipment responsible for sending and receiving signals to and from satellite 12, and may provide air interfaces for SGWs 19/IPGWs 20.

Satellite 12 may be any suitable communication satellite. For example, satellite 12 may be a bent-pipe design geostationary satellite, which can accommodate innovations and variations in transmission parameters, operating in the Ka-band, Ku-band or C-band. Satellite 12 may use one or more spot beams as well as frequency and polarization reuse to maximize the total capacity of satellite network 10. Signals passing through satellite 12 in the forward direction may be based on the DVB-S2 standard (ETSI EN 302 307) using signal constellations up to and including at least 32-APSK. The signals intended to pass through satellite in the return direction from mobile satellite terminal 100 may be based on the Internet Protocol over Satellite (IPoS) standard (ETSI TS 102 354). Other suitable signal types may also be used in either direction, including, for example higher data rate variations of DVB-S2.

IPGWs 20 may be an ingress portion of a local network. IP traffic, including TCP traffic originating from a host 40 from the internet, may enter an SGW 19 through IPGWs 20. SGW 19 may be connected to an internet through IPGWs 20. IP traffic, including TCP traffic, from the internet may enter SGW 19 through IPGWs 20. Multiple IPGWs may be connected to a single SGW. The bandwidth of RFT 16 and other RFTs (not shown) may be shared amongst IPGWs 20. At each of IPGWs 20, real-time (RT) and NRT traffic flows may be classified into different priorities. These traffic flows may be processed and multiplexed before being forwarded to priority queues at SGW 19. RT traffic may go directly to an RT priority queue or SGW 19, while NRT traffic flows may be serviced based on the respective priority and volume. Data may be further packed into DVB-S2 code blocks and stored in a code block buffer before transmission. IGMs 18 may be bandwidth controllers running bandwidth allocation algorithms. The IGMs may manage bandwidth of mobile satellite terminal 100 and other terminals in the form of inroute groups (IGs), based in part on bandwidth demand requests from the remote terminals Data from an internet intended for mobile satellite terminal 100 may be in the form of IP packets, including TCP packets and UDP packets, or any other suitable IP packets, and may enter a SGW 19 at any one of IPGWs 20. The IP packets may be processed and multiplexed by SGW 19 along with IP packets from other IPGWs, where the IPGWs may or may not have the same service capabilities and relative priorities. The IP packets may be transmitted to satellite 12 on forward uplink 23*a* using the air interface provided by RFT 16. Satellite 12 may them transmit the IP packet to the mobile satellite terminal 100 using forward downlink 23*b*. Similarly, IP packets may enter the network via mobile satellite terminal 100, be processed by the mobile satellite terminal 100, and transmitted to satellite 12 on return uplink 25*b*. Satellite 12 may then send these inroute IP packets to the IGMs 18/IPGWs 20 using return downlink 25*a*.

Mobile satellite terminal 100 may connect to the Internet or other network through satellite 12 and IPGWs 20/SGW 19 and provide access to the Internet or other network to one or more user devices 200 that connect to satellite terminal 100. In particular, mobile satellite terminal 100 may operate as an internet modem such that all network packets flow through it. For example, terminal 100 may provide IP address and other assignments via the dynamic host configuration protocol (DHCP), and respond to requests for renewal and updates; respond to ARP requests for any IP address not on the local subnet in instances where terminal 100 serves as the gateway to the internet; carry unicast IP (TCP and UDP) packets to the space link; carry multicast UDP/IP packets to the space link if enabled; accept IP packets directed to its local IP address (e.g., for WebUI); and perform other functions.

In some implementations, mobile satellite terminal 100 may be designed to be coupled to or integrated into a terrestrial or aerial vehicle (e.g., a truck or plane). In some implementations, terminal 100 may be designed to be coupled or integrated into an aquatic vehicle (e.g., a boat). In some implementations, mobile satellite terminal 100 may be designed as a portable terminal that may be carried by a user.

The one or more user devices 200 may include any user device that is provided access to the Internet or other network by a satellite modem of mobile satellite terminal. For example, the one or more user devices 200 may be a laptop, a desktop computer, a router, a tablet, a smartphone, etc. A user device 200 may transmit packets carrying frames (e.g., Ethernet frames) or packets that are converted to carry frames (e.g., by a WiFi module serving as an access point). For example, a user device 200 may communicatively couple to a modem of satellite terminal 100 over an ethernet cable. As another example, a user device 200 may wirelessly couple to a router (e.g., over WiFi) that is communicatively coupled to a modem of satellite 100 over an Ethernet cable. As a further example, a user device 200 may wirelessly transmit packets carrying frames (e.g., over WiFi) to a mobile satellite terminal 100. As further discussed below, a MAC of the mobile satellite terminal 100 may autonomously determine whether or not wake up a software processor of the mobile satellite terminal depending on information contained in the transmitted frames.

Figure 2:
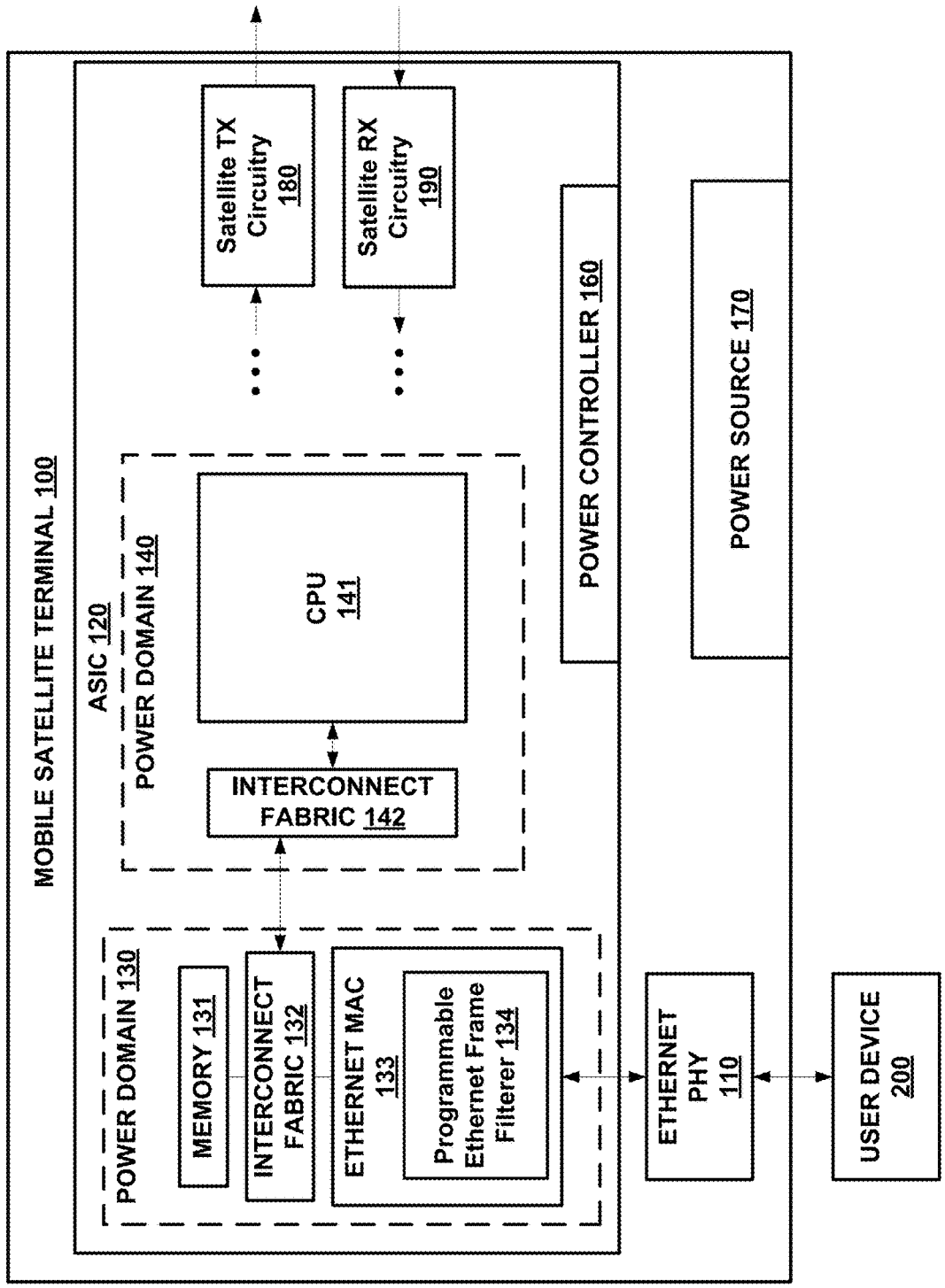
FIG. 2 is a block diagram illustrating an example architecture of some components that may be implemented in a mobile satellite terminal including an Ethernet MAC for autonomously determining whether or not wake up a software processor depending on information contained in a received Ethernet frame, in accordance with implementations of the technology disclosed herein.

FIG. 2 is a block diagram illustrating an example architecture of some components that may be implemented in a mobile satellite terminal 100 including an Ethernet MAC 133 for autonomously determining whether or not wake up a software processor depending on information contained in a received Ethernet frame, in accordance with implementations of the technology disclosed herein. It should be noted that although the example of FIG. 2 shows mobile satellite terminal 100 in direct communication with user device 200 over an Ethernet interface, in some implementations, mobile satellite terminal 100 may receive the packet from a separate router (e.g., over an Ethernet connection) that is communicatively coupled to user device 200 (e.g., over WiFi). In other implementations, mobile satellite terminal 100 may receive from the user device 200 a packet carrying a frame over WiFi. In some implementations, mobile satellite terminal may have an integrated router and satellite modem.

In this example, mobile satellite terminal 100 includes an ASIC 120, an Ethernet PHY 110, and power supply 170. It should be noted that although described in the context of Ethernet, the frame-filtering, power saving techniques described herein could be similarly applied in cases where user devices 200 communicate with mobile satellite terminal 100 using some other communication protocol. For example, the Ethernet PHY 110, Ethernet MAC 133 and programmable Ethernet Frame filterer 134 of mobile satellite terminal 100 may more generally be a PHY, MAC, and programmable frame filterer that operate in accordance with some other communication protocol (e.g., WiFi).

Ethernet PHY 110 may be a chip or circuitry that implements hardware transmit and receive functions of Ethernet frames, providing an interface between user device 200 and Ethernet MAC 133. For example, it may interface between the analog domain of an Ethernet's line modulation and the digital domain of link-layer packet signaling. Although Ethernet PHY 110 is illustrated in this example as being separate from ASIC 120, in other implementations it may be a component of ASIC 120.

Power source 170 may be to power Ethernet PHY 110, ASIC 120 and other components of mobile satellite terminal 100 (not pictured). It may be implemented as any suitable mobile power source. For example, it may be implemented as a rechargeable battery (e.g., lithium-ion battery) that may be charged using an AC/DC power supply.

ASIC 120 may include a memory 131, interconnect fabric 132, Ethernet MAC 133, interconnect fabric 142, CPU 141, power controller 160, satellite TX circuitry 180, and satellite RX circuitry 190.

By virtue of utilizing an ASIC 120 in mobile satellite terminal 100, power controller 160 may be able to independently supply power from power source 170 to different power domains of ASIC 120 to achieve power savings in accordance with disclosure. In the example of FIG. 2, memory 131, interconnect fabric 132, and Ethernet MAC 133 are components of a first power domain 130; and CPU 141 and interconnect fabric 142 are components of a second power domain 140. The first power domain 130 may be a peripheral power domain including user-facing peripherals that need to continue operation during a lower-power state of the mobile satellite terminal 100. The second power domain 140 may be a software processor power domain including the CPU 141, other peripherals, and connections to the peripheral power domain (e.g., interconnect fabric 142) for use when the software processor domain is active. During operation, power controller 160 may wake up CPU 141 when any wakeable stimuli are active. As further discussed below, one of those wakeable stimuli may be an interrupt signal from Ethernet MAC 133.

Interconnect fabric 132 and interconnect fabric 142 may be part of a bus or other chip interconnect fabric. In the example of FIG. 2, interconnect fabric 132 and interconnect fabric 142 may provide a memory bus fabric that provides CPU 141 with access to memory 131. Interconnect fabric 132 may provide Ethernet MAC 133 with access to memory 131. It should be noted, however, that other arrangements of interconnect fabric may be used to provide Ethernet MAC 132 and CPU 141 access to memory 131.

During operation of mobile satellite terminal 100, memory 131 may be to hold data structures and buffers for receiving Ethernet packets. For instance, as further discussed below, it may be implemented as a random access memory (RAM) that buffers Ethernet packets that are not filtered out by Ethernet MAC 133.

Satellite TX circuitry 180 and satellite RX circuitry 190 may be components of a satellite modem configured to communicate with a satellite. For example, satellite TX circuitry 180 may apply functions for transmitting data (e.g., user data appearing at the local Ethernet connection destined to the satellite link) such as forward error correction (FEC) encoding, bit-to-symbol modulation, transmit pulse-shaping, carrier signal modulation, and other satellite transmission functions. Satellite RX circuitry may provide functions to a satellite receive signal such as carrier down conversion, receive pulse-shaping, symbol-to-bit decoding, and other satellite receiver functions. One or more of the components satellite TX circuitry 180 and RX circuitry 190 may be implemented in the mobile satellite terminal 100 in either digital form (e.g., as software running on a digital signal processor (DSP) or other processing device), as analog components, or some combination thereof. The satellite TX circuitry 180 and satellite RX circuitry 190 may part of a satellite modem domain that may powered on an off separately from power domains 130 and 140. As such, any power saving benefits achieved using implementations of the disclosure described herein may be achieved independently and additionally to any power saving techniques that are used in a satellite modem domain that communicates with a satellite.

Although in the example of FIG. 2, Ethernet MAC 133 and CPU 141 are illustrated as being in different power domains of an ASIC, in other embodiments, independent power control of the two components may be implemented by having Ethernet MAC 133 and CPU 141 on different chips. For example, memory 131, interconnect fabric 132, and Ethernet MAC 133 may be components of a first chip, and CPU 141 and interconnect fabric 142 may be components of a second chip. Additionally, it should be appreciated that although the example of FIG. 2 leverages ASIC technology to use different ASIC power domains to provide independent power control of Ethernet MAC 133 and CPU 141, in other implementations other suitable chip technology or circuitry that provides power domain control on the same chip may be used. Furthermore, it should be appreciated that although satellite TX/RX circuitry 180, 190 is illustrated as being on the same chip (i.e., ASIC 120) as Ethernet MAC 133 and CPU 141, in other implementations, it may be implemented on another chip.

As discussed above, Ethernet MAC 133 is configured to autonomously determine whether or not wake up a software processor (e.g., CPU 141) depending on information contained in a received Ethernet frame. To this end, Ethernet MAC 133 may be programmed with a programmable Ethernet frame filterer 134, which may be implemented as machine readable instructions or code for filtering Ethernet frames received from user devices 200. In some implementations, the Ethernet MAC 133 may be initially programmed by the software processor (e.g., CPU 141) when the mobile satellite terminal 100 is not in a lower-power state (e.g., when power domain 140 is receiving power), such that Ethernet MAC 133 may make the Ethernet frame accept and reject decisions autonomously, without interaction from the software processor. For example, the software processor may run an operating system (OS) of mobile satellite terminal 100, and the OS may have a driver for initializing and operating the MAC, including the Ethernet frame filter configuration of filterer 134. Once configured, the Ethernet frame filterer 134 may operate autonomously and transparently.

The Ethernet frame filterer 134 specifies one or more filters for determining whether to accept or drop an Ethernet frame. Upon receipt of a frame at Ethernet MAC 133, the one or more filters are applied to the frame by examining one or more fields or bits of the frame. For example, the one or more fields may comprise at least one of: a source or destination MAC address, a source or destination internet protocol (IP) address, a field indicating what protocol (e.g., IP, ARP, DHCP, UDP, TCP, etc.) is encapsulated in a payload of the frame, a field containing port information from the user datagram protocol (UDP) or transmission control protocol (TCP).

The one or more filters may be generally configured such that the Ethernet MAC 133 drops a received Ethernet frame if it contains a payload that is never sent over a satellite space link and/or is not directed at the mobile satellite terminal 100 itself. For example, the Ethernet MAC 133 may be configured to drop the frame based on the application of the one or more filters if at least one of the following conditions is satisfied by the frame: it contains an address resolution protocol (ARP) resolve request for IP addresses on a local subnet that is not for the satellite terminal's IP address; it is a unicast frame not directed at the satellite terminal; it contains a protocol that operates only on the local subnet and is used for local device discovery; it is sent by an IP address that is not allowed to use the space link; and it is sent by a MAC address that is not on a whitelist.

FIG. 3 is a table illustrating instructions under which an Ethernet MAC 133 may be programmed to reject or accept Ethernet frames, in accordance with a particular implementation of the disclosure. In this example, Ethernet frame filtering is performed by examining a value of a field in a received frame and determining whether to accept the frame, reject the frame, or proceed to the next instruction. It should be appreciated that the example set of 17 instructions shown in FIG. 3 are by way of illustration only, and that additional, fewer, or alternative instructions may be implemented. Furthermore, it should be appreciated that although frame filtering in this example is performed by sequentially moving through a set of instructions (starting with instruction no. 1) until a decision is made to accept or reject a frame, other implementations may perform frame filtering by reviewing multiple instructions in parallel, by reviewing instructions out of sequence, or by reviewing instructions in some other manner that examines the values of fields or bits of a received frame.

Figure 4:
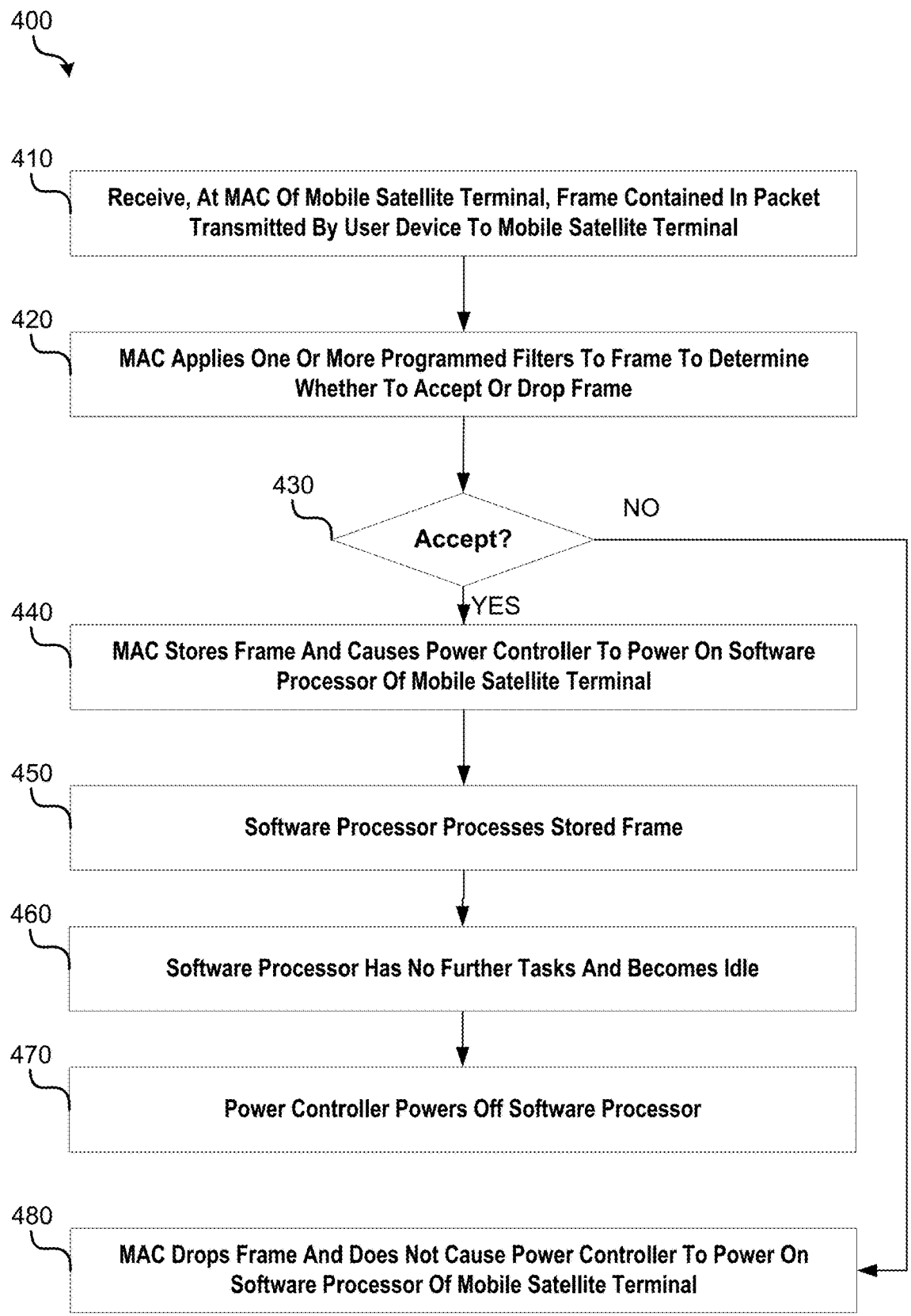
FIG. 4 is an operational flow diagram illustrating an example method that may be implemented by a mobile satellite terminal, in accordance with implementations of the disclosure.
Figure 5:
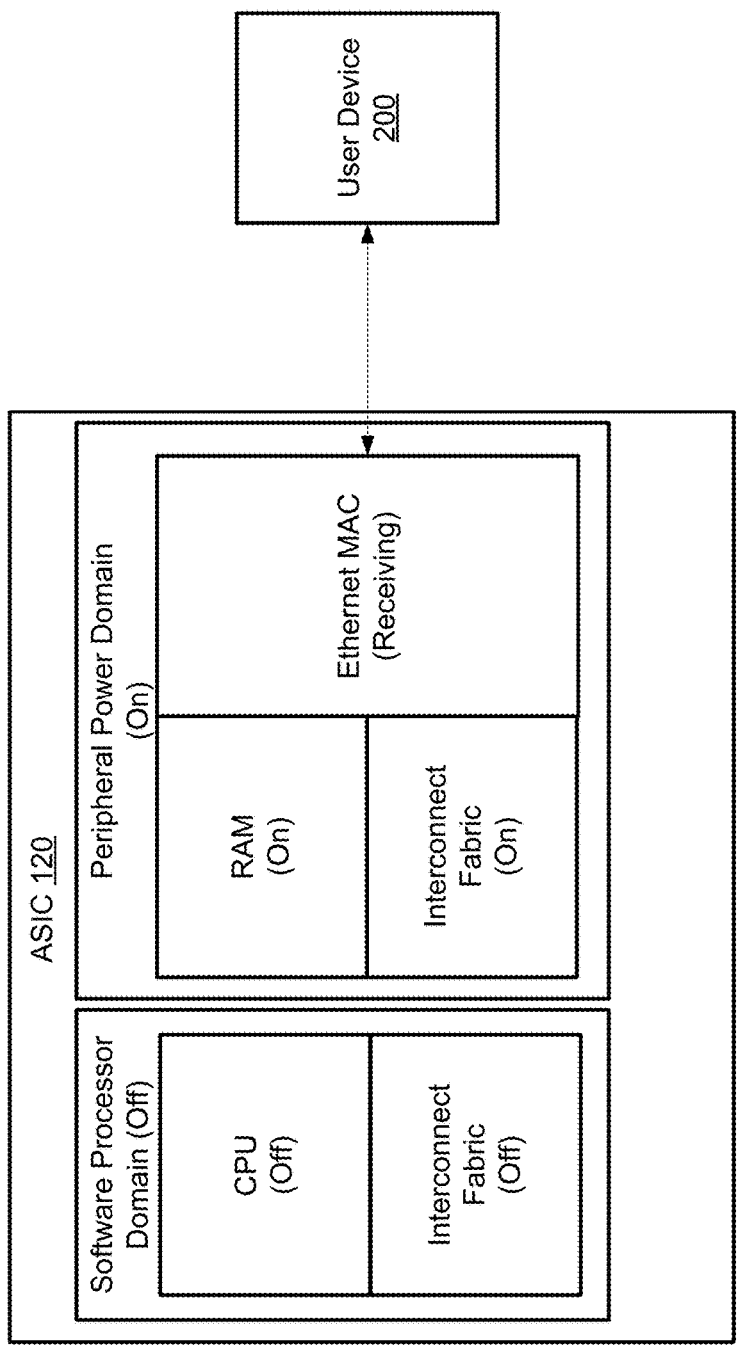
FIG. 5 illustrates example power domains of an ASIC of a mobile satellite terminal during a low power state, in accordance with implementations of the disclosure.

FIG. 4 is an operational flow diagram illustrating an example method 400 that may be implemented by a mobile satellite terminal (e.g., mobile satellite terminal 100), in accordance with implementations of the disclosure. Prior to implementing method 400, a MAC (e.g., an Ethernet MAC 133) of the mobile satellite terminal may be programmed with machine readable instructions for filtering frames (e.g., instructions for filtering Ethernet frames as discussed above with reference to FIGS. 2 and 3). This may occur prior to the mobile satellite terminal entering the low power state such that the MAC can make the frame accept and reject decisions autonomously, without interaction from the software processor. Once in the low power state, a power domain including the mobile satellite terminal's CPU may be powered off whereas a power domain including the mobile satellite terminal's MAC may be powered on. One such example of a power domain configuration is illustrated by FIG. 5, which illustrates example power domains of an ASIC of a mobile satellite terminal during a low power state, in accordance with implementations of the disclosure.

At operation 410, the MAC of the mobile satellite terminals receives a frame contained in a packet transmitted by a user device to the mobile satellite terminal.

At operation 420, the MAC determines whether to accept or drop the frame by automatically applying one or more programmed filters to the frame. For instance, as discussed above, one or more fields or bits of the frame may be examined. The one or more fields may comprise at least one of: a source or destination MAC address, a source or destination internet protocol (IP) address, a field indicating what protocol (e.g., IP, ARP, DHCP, UDP, TCP, etc.) is encapsulated in a payload of the frame, a field containing port information from the user datagram protocol (UDP) or transmission control protocol (TCP). The one or more filters may be generally configured such that the MAC 133 drops a received frame if it contains a payload that is never sent over a satellite space link and/or is not directed at and useful to the mobile satellite terminal 100 itself.

If based on the application of the one or more filters, the MAC determines that the frame should not be accepted (decision 430), at operation 480 the MAC may drop the frame without causing a power controller of the mobile satellite terminal to power on a software processor (e.g., CPU) of the mobile satellite terminal. As the foregoing discussion illustrates, even though the frame arrives while the software processor is powered off, the frame is still received and processed (e.g., dropped) by the MAC. This process may be completely transparent to the user.

Figure 6:
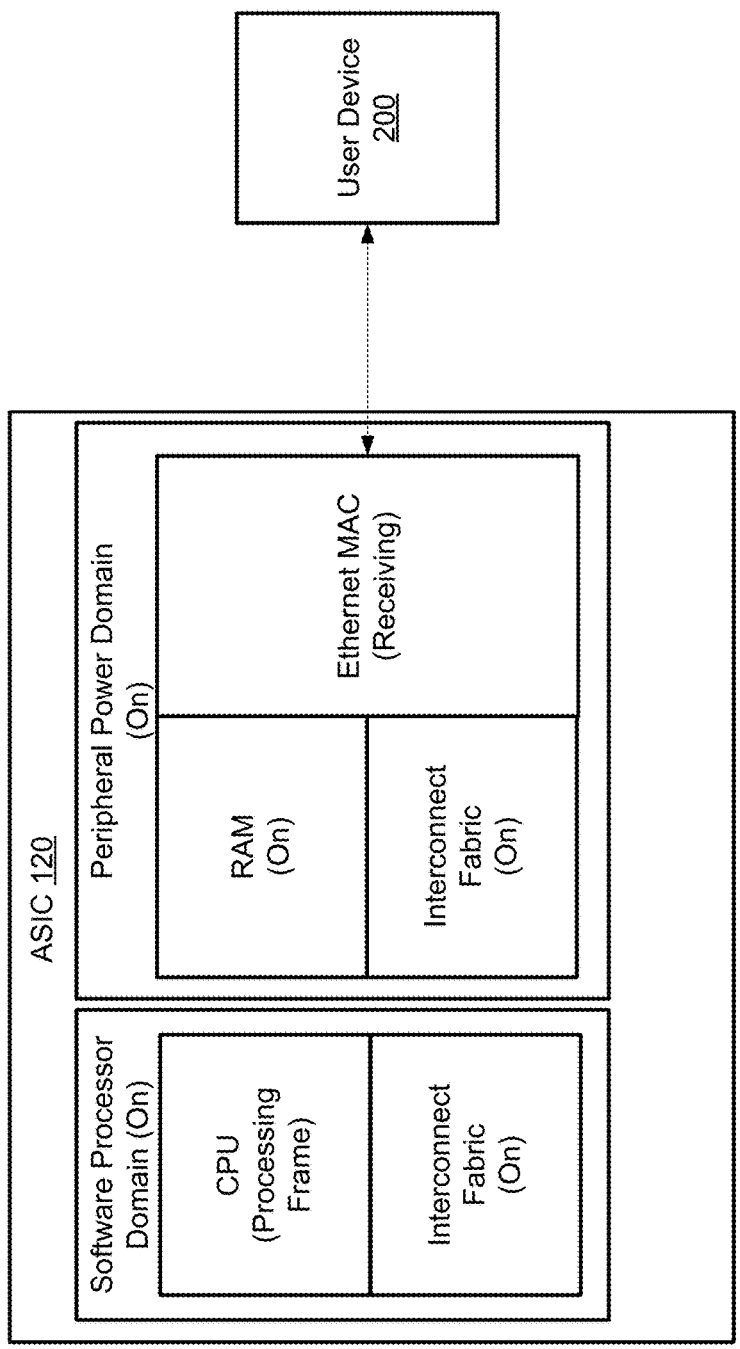
FIG. 6 illustrates example power domains of the ASIC of FIG. 5 after performing an operation to return a regular power state, in accordance with implementations of the disclosure.

Conversely, if the MAC determines that the frame should be accepted (decision 430), at operation 440 the MAC may store the frame in memory and cause the power controller to power on the software processor of the mobile satellite terminal to process the stored frame. For example, the MAC may assert an interrupt to the software processor that causes the power controller to power on the software processor, which receives and services the interrupt. By way of example, FIG. 6 illustrates example power domains of the ASIC of FIG. 5 after performing operation 440 to return a regular power state, in accordance with implementations of the disclosure.

At operation 450, the software processor processes the frame stored in the memory. For example, the software processor may copy the frame deposited in memory by the MAC, and pass the frame to the software processor's IP stack software for processing. If the frame is directed at the satellite modem itself, then this processing may include parsing the frame, understanding the request, and generating a response. Such processing may be part of a web UI, diagnostic log gathering, or any other applications running on the satellite modem. Otherwise, for frames directed toward the space link, the SW processor may route the frame toward the satellite TX circuitry 180, fragmenting it into bursts, and transmitting that frame over the air toward a satellite 12 and on to an IGW 20.

At operation 460, the software processor has no further tasks and becomes idle. Thereafter, at operation 470 the power controller may power off the software processor and method 400 may iterate.

Figure 7:
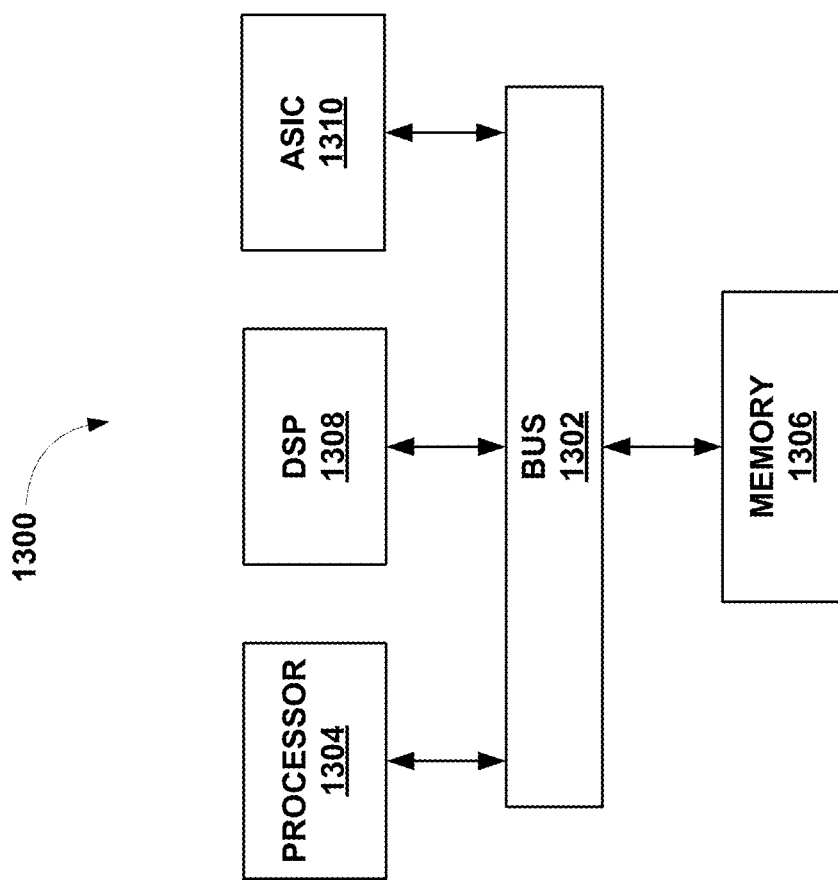
FIG. 7 illustrates an example chip set that can be utilized in implementing architectures and methods in accordance with various implementations of the disclosure.

FIG. 7 illustrates a chip set 1300 in which embodiments of the disclosure may be implemented. Chip set 1300 can include, for instance, processor and memory components incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, chip set 1300 includes a communication mechanism such as a bus 1302 for passing information among the components of the chip set 1300. A processor 1304 has connectivity to bus 1302 to execute instructions and process information stored in a memory 1306. Processor 1304 includes one or more processing cores with each core configured to perform independently. A multi-core processor enables multiprocessing within a single physical package. Examples of a multi-core processor include two, four, eight, or greater numbers of processing cores. Alternatively or in addition, processor 1304 includes one or more microprocessors configured in tandem via bus 1302 to enable independent execution of instructions, pipelining, and multithreading. Processor 1304 may also be accompanied with one or more specialized components to perform certain processing functions and tasks such as one or more digital signal processors (DSP) 1308, and/or one or more application-specific integrated circuits (ASIC) 1310. DSP 1308 can typically be configured to process real-world signals (e.g., sound) in real time independently of processor 1304. Similarly, ASIC 1310 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

Processor 1304 and accompanying components have connectivity to the memory 1306 via bus 1302. Memory 1306 includes both dynamic memory (e.g., RAM) and static memory (e.g., ROM) for storing executable instructions that, when executed by processor 1304, DSP 1308, and/or ASIC 1310, perform the process of example embodiments as described herein. Memory 1306 also stores the data associated with or generated by the execution of the process.

In this document, the terms "machine readable medium," "computer readable medium," and similar terms are used to generally refer to non-transitory mediums, volatile or non-volatile, that store data and/or instructions that cause a machine to operate in a specific fashion. Common forms of machine readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

The various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Each of the processes, methods, and algorithms described in the preceding sections may be embodied in, and fully or partially automated by, code components executed by one or more computer systems or computer processors comprising computer hardware. The processes and algorithms may be implemented partially or wholly in application-specific circuitry. The various features and processes described above may be used independently of one another, or may be combined in various ways. Different combinations and subcombinations are intended to fall within the scope of this disclosure, and certain method or process blocks may be omitted in some implementations. Additionally, unless the context dictates otherwise, the methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A mobile satellite terminal, comprising:
    a power controller to control power supplied to components of the mobile satellite terminal;
    a satellite modem configured to communicate over a satellite space link;
    a software processor;
    a memory; and
    a media access controller (MAC) configured to:
        receive a frame contained in a packet transmitted by a user device to the mobile satellite terminal;
        examine one or more fields of the frame to determine, based at least on whether the one or more fields indicate that the frame contains a payload that is to be sent over the satellite space link or that is directed at the mobile satellite terminal, whether or not to accept the frame at the mobile satellite terminal;
        when the frame is accepted: store the frame in the memory, and cause the power controller to power on the software processor to process the stored frame; and
        when the frame is not accepted: drop the frame without causing the power controller to power on the software processor.

2. The mobile satellite terminal of claim 1, wherein the power controller, the MAC, the memory, and the software processor are components of a single chip of the mobile satellite terminal, wherein the MAC and software processor are part of two different power domains of the chip that the power controller can separately power on.

3. The mobile satellite terminal of claim 2, wherein the memory, the MAC, and the software processor are components of an application specification integrated circuit (ASIC) of the mobile satellite terminal.

4. The mobile satellite terminal of claim 3, wherein the two different power domains comprise:
    a peripheral power domain comprising user-facing peripherals that continue normal operation during a low-power state, the user-facing peripherals comprising the MAC, the memory, and memory bus fabric between the MAC and memory; and
    a software processor domain comprising the software processor and connections to the peripheral power domain for use when the software processor domain is active.

5. The mobile satellite terminal of claim 3, wherein the satellite modem comprises a digital signal processor.

6. The mobile satellite terminal of claim 2, wherein after the MAC causes the power controller to power on the software processor, the software processor is configured to process the stored frame, wherein after the software processor processes the stored frame and subsequently becomes idle, the power controller is configured to power off the power domain containing the software processor while leaving on the power domain containing the MAC.

7. The mobile satellite terminal of claim 1, wherein the MAC is on a first chip of the mobile satellite terminal and the software processor is on a second chip of the mobile satellite terminal, wherein the power controller can independently power the first and second chips.

8. The mobile satellite terminal of claim 1, wherein the one or more fields comprise a value indicating: a source or destination media access control address, a source or destination internet protocol (IP) address, what protocol is encapsulated in a payload of the frame, port information from the user datagram protocol (UDP) or transmission control protocol (TCP), whether the frame is a multicast frame, or whether the frame includes a response identifier or request identifier.

9. The mobile satellite terminal of claim 8, wherein examining the one or more fields of the frame to determine, based at least on whether the one or more fields indicate that the frame contains the payload that is to be sent over the satellite space link or that is directed at the mobile satellite terminal, whether or not to accept the frame at the mobile satellite terminal, comprises: determining whether the frame contains an address resolution protocol (ARP) resolve request for IP addresses on a local subnet that is not for the satellite terminal's IP address; determining whether the frame is a unicast frame not directed at the satellite terminal; determining whether the frame contains a protocol that operates only on the local subnet and is used for local device discovery; determining whether the frame is sent by an IP address that is not allowed to use the space link; or determining whether the frame is sent by a MAC address that is not on a whitelist.

10. The mobile satellite terminal of claim 1, wherein causing the power controller to power on the software processor to process the stored frame comprises: asserting, by the MAC, an interrupt to the power controller and software processor, wherein when the power controller powers on the software processor, the software processor receives and services the interrupt, copies the frame deposited in memory by the MAC, and passes the frame to the software processor's network stack software.

11. The mobile satellite terminal of claim 1, wherein the MAC is programmed by the software processor such that the MAC can autonomously make decisions to accept or drop frames, without interaction from the software processor.

12. The mobile satellite terminal of claim 1, wherein the MAC is an Ethernet MAC, wherein the frame is an Ethernet frame.

13. A method comprising:
communicating, by a satellite modem of a mobile satellite terminal, over a satellite space link;
receiving, at a media access controller (MAC) of the mobile satellite terminal, a frame contained in a packet transmitted by a user device to the mobile satellite terminal;
examining, at the MAC, one or more fields of the frame to determine, based at least on whether the one or more fields indicate that the frame contains a payload that is to be sent over the satellite space link or that is directed at the mobile satellite terminal, whether or not to accept the frame at the mobile satellite terminal;
when the frame is accepted: the MAC storing the frame in a memory of the mobile satellite terminal, and causing a power controller of the mobile satellite terminal to power on a software processor of the mobile satellite terminal to process the stored frame; and
when the frame is not accepted: the MAC dropping the frame without causing the power controller to power on the software processor.

14. The method of claim 13, further comprising:
accepting the frame; and
after the MAC causes the power controller to power on the software processor, processing the stored frame using the software processor.

15. The method of claim 13, wherein the one or more fields comprise a value indicating: a source or destination media access control address, a source or destination internet protocol (IP) address, what protocol is encapsulated in a payload of the frame, port information from the user datagram protocol (UDP) or transmission control protocol (TCP), whether the frame is a multicast frame, or whether the frame includes a response identifier or request identifier.

16. The method of claim 13, wherein the power controller, the MAC, the memory, and the software processor are components of a single chip of the mobile satellite terminal, wherein the MAC and software processor are part of two different power domains of the chip that the power controller can separately power on.

17. A non-transitory computer readable medium having executable instructions stored thereon that when executed by a processor, cause a mobile communication terminal to perform operations comprising:
receiving a frame contained in a packet transmitted by a user device to the mobile communication terminal;
examining one or more fields of the frame to determine, based at least on whether the one or more fields indicate that the frame contains a payload that is to be sent over a satellite space link or that is directed at the mobile communication terminal, whether or not to accept the frame at the mobile communication terminal;
when the frame is accepted: storing the frame in a memory, and causing a power controller to power on a software processor of the mobile communication terminal to process the stored frame; and
when the frame is not accepted: dropping the frame without causing the power controller terminal to power on the software processor.

18. The non-transitory computer readable medium of claim 17, wherein the operations of receiving the frame, examining the one or more fields of the frame, storing the frame, and dropping the frame are performed by a media access controller (MAC) of the mobile communication terminal, wherein the mobile communication terminal is a mobile satellite terminal.

* * * * *